US011144000B2

(12) United States Patent
Honda et al.

(10) Patent No.: US 11,144,000 B2
(45) Date of Patent: Oct. 12, 2021

(54) PAPER EJECTION DEVICE AND IMAGE FORMING APPARATUS

(71) Applicant: FUJIFILM Business Innovation Corp., Tokyo (JP)

(72) Inventors: Fumiyuki Honda, Kanagawa (JP); Yukihiro Ichiki, Kanagawa (JP); Sota Hara, Kanagawa (JP); Kenichi Ishikura, Kanagawa (JP); Kazuhiro Tobita, Kanagawa (JP); Sho Ogawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 153 days.

(21) Appl. No.: 16/534,425

(22) Filed: Aug. 7, 2019

(65) Prior Publication Data

US 2020/0257231 A1 Aug. 13, 2020

(30) Foreign Application Priority Data

Feb. 8, 2019 (JP) ............................. JP2019-021355

(51) Int. Cl.

| | |
|---|---|
| ***G01G 15/00*** | (2006.01) |
| ***B65H 29/00*** | (2006.01) |
| ***B65H 29/70*** | (2006.01) |
| ***B65H 31/00*** | (2006.01) |
| ***B65H 31/22*** | (2006.01) |
| ***G03G 15/00*** | (2006.01) |

(52) U.S. Cl.

CPC ..... *G03G 15/6552* (2013.01); *G03G 15/6576* (2013.01)

(58) Field of Classification Search

CPC .. B65H 29/00; B65H 29/70; B65H 31/00–22; B65H 83/00; G03G 15/00; G03G 15/6552; G03G 15/6576

See application file for complete search history.

(56) References Cited

U.S. PATENT DOCUMENTS

| | | | | |
|---|---|---|---|---|
| 5,497,984 A * | 3/1996 | Murakami | ................ | B42C 1/12 270/58.02 |
| 6,227,536 B1 * | 5/2001 | Bethke | ................... | B65H 31/22 271/207 |
| 7,963,524 B2 * | 6/2011 | Ohta | ...................... | B65H 31/02 271/213 |
| 8,757,791 B2 | 6/2014 | Tanaka et al. | | |
| 8,811,884 B2 * | 8/2014 | Suzuki | ................... | G03G 15/00 399/405 |

(Continued)

FOREIGN PATENT DOCUMENTS

| | | | |
|---|---|---|---|
| JP | 2010224283 A * | 10/2010 | ............. G03G 15/00 |
| JP | 2012-140245 A | 7/2012 | |

*Primary Examiner* — Nguyen Q. Ha

(74) *Attorney, Agent, or Firm* — Sughrue Mion, PLLC

(57) ABSTRACT

A paper ejection device includes: an ejection portion that ejects sheets of paper; a housing portion that houses the ejected sheets of paper in a sequentially stacked state; and a guiding portion that guides the sheets of paper, before being ejected, to the ejection portion while curving the sheets of paper. The housing portion is adjustable to plural angles including at least an angle at which the ejected sheets of paper are housed while being curved in a direction opposite to a direction in which the sheets of paper have been curved by the guiding portion.

12 Claims, 8 Drawing Sheets

(56) References Cited

U.S. PATENT DOCUMENTS

| | | | | |
|---|---|---|---|---|
| 8,960,667 | B2 * | 2/2015 | Nakamura | B65H 31/02<br>271/209 |
| 9,248,990 | B2 * | 2/2016 | Morita | B65H 31/02 |
| 2005/0140086 | A1 * | 6/2005 | Ono | B65H 31/02<br>271/207 |
| 2007/0147923 | A1 * | 6/2007 | Uehara | G03G 15/6576<br>399/406 |

* cited by examiner

PAPER EJECTION DEVICE AND IMAGE FORMING APPARATUS

CROSS-REFERENCE TO RELATED APPLICATIONS

This application is based on and claims priority under 35 USC 119 from Japanese Patent Application No. 2019-021355 filed Feb. 8, 2019.

BACKGROUND

(i) Technical Field

The present disclosure relates to a paper ejection device and an image forming apparatus.

(ii) Related Art

A device that ejects paper after processing the paper is known. For example, in the case of an image forming apparatus that forms an image on paper, paper on which an image has been formed is ejected out of the apparatus. There are devices structured to guide paper to a paper ejection port while curving the paper because of constraints such as the compactness of the device and the arrangement of members in the device.

In the case of the devices structured to guide paper to the paper ejection port while curving the paper, paper ejected from the ejection port may remain curled because of being curved during ejection.

Japanese Unexamined Patent Application Publication No. 2012-140245 proposes a device that includes a paper ejection tray disposed obliquely at the upper portion of the device. Paper being ejected is pressed against the paper ejection tray to curl the paper in the opposite direction, thereby uncurling the paper.

SUMMARY

The degree of the curl of the paper due to being curved during ejection significantly differs in accordance with the thickness of the paper, the hygrothermal environment, etc. In addition, it depends on the user or the usage of the ejected paper whether or not it is necessary to correct the curl of the paper or to what degree the curl of the paper should be corrected.

Aspects of non-limiting embodiments of the present disclosure relate to providing a paper ejection device and an image forming apparatus that correct curl flexibly compared to a structure in which the position or the angle of a housing portion that houses ejected paper is fixed such as the paper ejection tray described above.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a paper ejection device including: an ejection portion that ejects sheets of paper; a housing portion that houses the ejected sheets of paper in a sequentially stacked state; and a guiding portion that guides the sheets of paper, before being ejected, to the ejection portion while curving the sheets of paper, in which the housing portion is adjustable to a plurality of angles including at least an angle at which the ejected sheets of paper are housed while being curved in a direction opposite to a direction in which the sheets of paper have been curved by the guiding portion.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below.

Figure 1:
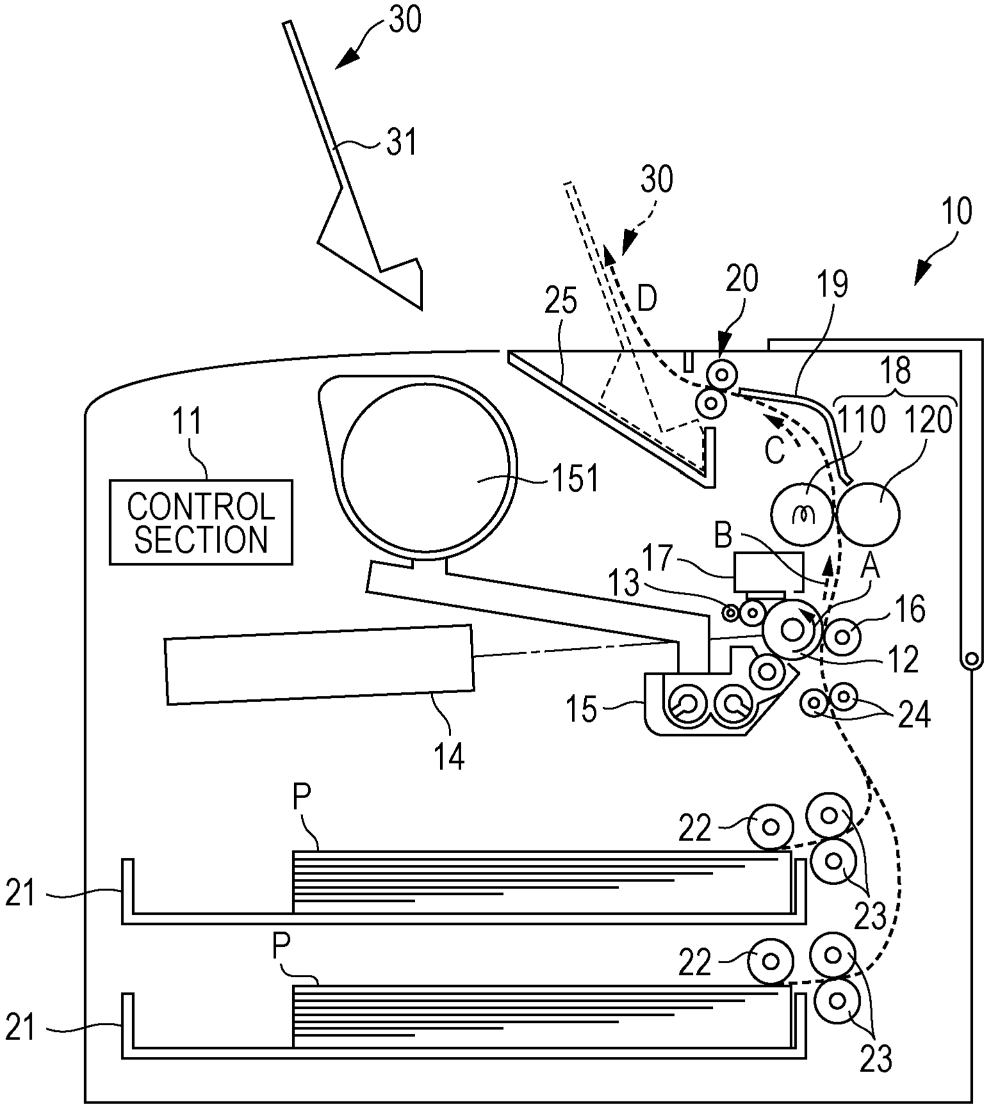
FIG. 1 illustrates a schematic configuration of a printer as an image forming apparatus according to an exemplary embodiment of the present disclosure.

FIG. 1 illustrates a schematic configuration of a printer as an image forming apparatus according to an exemplary embodiment of the present disclosure. The printer includes a paper ejection device according to a first exemplary embodiment of the present disclosure.

A printer 10 illustrated in FIG. 1 is a monochrome printer of a so-called electrophotographic system. An image signal that represents an image and that is prepared by a device that is different from the printer 10 such as a personal computer, for example, is input to the printer 10 via a signal cable (not illustrated) etc. The printer 10 includes a control section 11 that controls operation of constituent elements in the printer 10. The image signal is input to the control section 11. The printer 10 forms an image on the basis of the image signal under control by the control section 11.

The control section 11 includes a function as an information processing device composed of a central processing unit (CPU) that executes a program, a memory, etc. In the printer 10, operation for image formation is controlled through execution of a control program in the control section 11.

A paper tray 21 is provided at the lower portion of the printer 10. Sheets of paper P are housed in the paper tray 21 in a stacked state. The paper tray 21 is drawable to be supplemented with the paper P. The size of the paper P housed in the paper tray 21 may be changed by a user. Sheets of paper P of different sizes or thicknesses may be housed in a plurality of paper trays 21. The size or the thickness of the paper P which is actually housed in the paper tray 21 is recognized by the control section 11, and used to control various portions. Although not illustrated, the printer 10 is incorporated with an automatic recognition mechanism based on a sensor etc. that is necessary for such recognition, or a recognition mechanism based on user input etc.

The paper P in the paper tray 21 is fed to stand-by rollers 24 by a pick-up roller 22 and handling rollers 23. The paper P which has reached the stand-by rollers 24 is further transported at an adjusted transport timing.

The printer 10 includes a cylindrical photoconductor 12 that is rotatable in the direction indicated by the arrow A. A charging unit 13, an exposure unit 14, a developing unit 15, a transfer unit 16, and a photoconductor cleaner 17 are disposed around the photoconductor 12.

The charging unit 13 charges the surface of the photoconductor 12. The exposure unit 14 forms an electrostatic latent image by exposing the surface of the photoconductor 12 to light in accordance with an image signal sent from the control section 11. The electrostatic latent image is developed by the developing unit 15 to form a toner image. The printer 10 includes a toner bottle 151 that contains a toner. When the toner is consumed by the developing unit 15, the developing unit 15 is supplemented with the toner from the toner bottle 151.

The stand-by rollers 24 described above feed the paper P such that the paper P reaches a position facing the transfer unit 16 in accordance with the timing when the toner image on the photoconductor 12 reaches the position. The toner image formed on the photoconductor 12 is transferred onto the paper P which has been fed by the action of the transfer unit 16. Consequently, an unfixed toner image is formed on the paper P.

The paper P on which an unfixed toner image has been formed is further moved in the direction of the arrow B, and passes through a fixing unit 18. The fixing unit 18 includes a heating roller 110 and a pressurizing roller 120. The heating roller 110 includes a heating source 111 inside. The pressurizing roller 120 applies a pressure to the heating roller 110. When the paper P passes through the fixing unit 18, the paper P is heated and pressurized as clamped between the heating roller 110 and the pressurizing roller 120. As a result, an image as a fixed toner image is formed on the paper P.

The paper P which has passed through the fixing unit 18 is moved in the direction of the arrow C while being guided by a chute 19, and further ejected onto a paper ejection tray 25 by an ejection unit 20 to be housed in the paper ejection tray 25.

The paper P which has passed through the fixing unit 18 is moved toward the ejection unit 20 while being forcibly curved along the chute 19. Therefore, the paper P may be ejected onto the paper ejection tray 25 with curl due to being curved, depending on the type of the paper P. The printer 10 is a printer of an electrophotographic system, and includes the fixing unit 18. Therefore, the paper P is curved by the chute 19 after being heated, ejected onto the paper ejection tray 25 while returning to normal temperature, and returns to normal temperature. Therefore, the paper P tends to remain curled.

Thus, the printer 10 includes a removable second paper ejection tray 30. The removable paper ejection tray 30 is structured to be stabilized by simply being placed on the paper ejection tray 25 which is fixed. When the removable paper ejection tray 30 is placed on the fixed paper ejection tray 25, the paper ejection tray 30 houses the ejected paper in place of the fixed paper ejection tray 25.

A surface 31 of the removable paper ejection tray 30 to receive the paper P is oblique, but is much closer to being perpendicular than the fixed paper ejection tray 25. In addition, the surface 31 is much closer to the ejection unit 20 than the fixed paper ejection tray 25. Therefore, the paper P which is ejected from the ejection unit 20 is moved along the surface 31 of the removable paper ejection tray 30 while being curved in contact with the surface 31. The paper P is curved when contacting the surface 31 in the direction opposite to the direction in which the paper P is curved when moving in contact with the chute 19. Therefore, the paper P is housed in the paper ejection tray 30 with the curl due to the chute 19 corrected. As described above, the paper P is heated by the fixing unit 18, and ejected while being cooled. Paper is easily curled when heated, and the curl is not easily corrected when the paper is cooled. Therefore, the paper is preferably curved by the paper ejection tray 30 more sharply than curved by the chute 19. The sharpness of the curves will be discussed later.

The fixing unit 18 corresponds to an example of a heating portion according to the present disclosure. The ejection unit 20 corresponds to an example of an ejection portion according to the present disclosure. The chute 19 corresponds to an example of a guiding portion according to the present disclosure. The combination of the fixed paper ejection tray 25 and the removable paper ejection tray 30 corresponds to an example of a housing portion according to the present disclosure. The fixed paper ejection tray 25 corresponds to an example of a first housing portion according to the present disclosure. The removable paper ejection tray 30 corresponds to an example of a second housing portion according to the present disclosure.

With the configuration in FIG. 1, it is possible to correct curl of paper by using the removable paper ejection tray 30 when it is necessary to correct the curl. In the case where paper that is not easily curled is used or in the case where it does not matter if paper is curled, on the other hand, the removable paper ejection tray 30 may be removed to simplify the device configuration.

Paper ejection devices according to second and subsequent exemplary embodiments will be described below. In the following, the entire printer will not be described, and only an overview of a paper ejection device that includes components from the fixing unit to the paper ejection tray will be described with reference to the drawings. In the paper ejection devices according to the exemplary embodiments described below, the paper ejection tray is attached to a device, rather than being removable. However, the paper ejection tray may be combined with the configuration in FIG. 1 to be removable.

Figure 2:
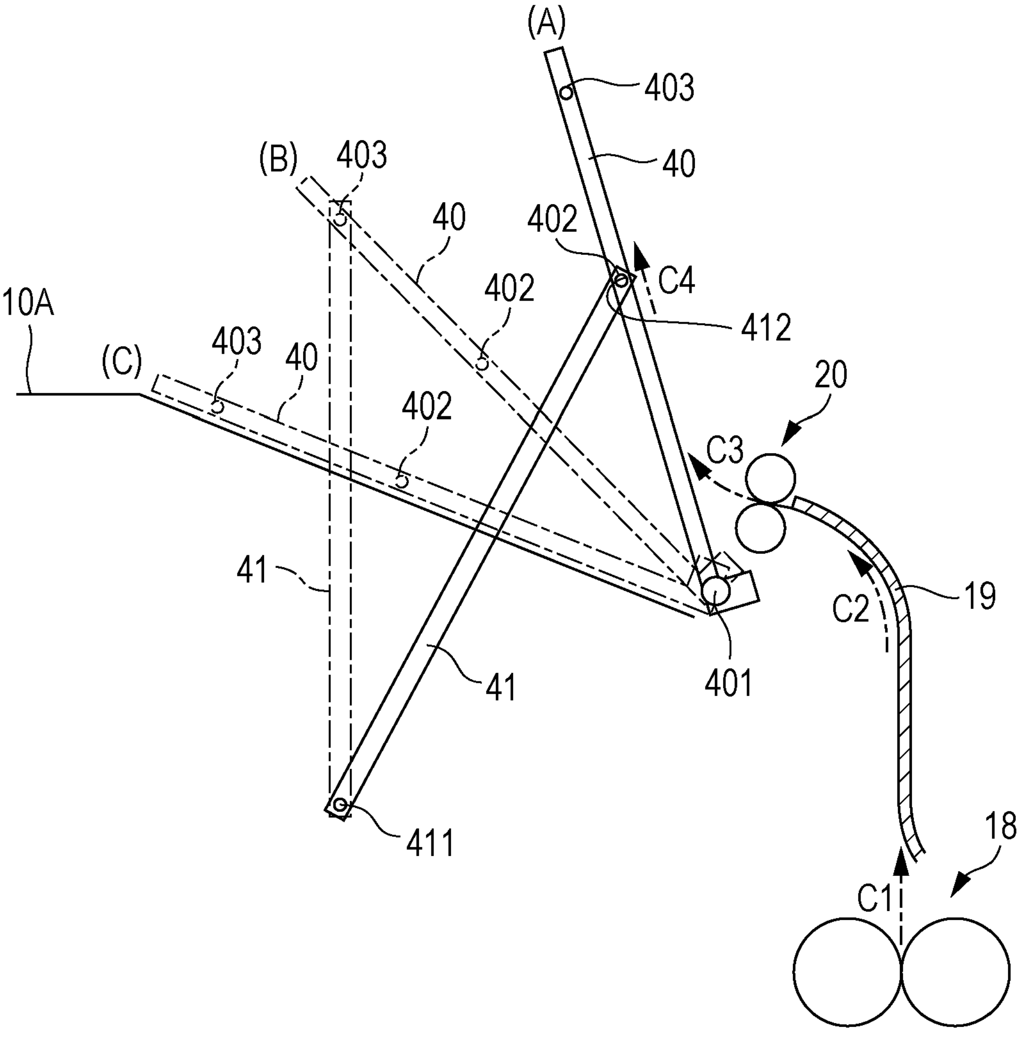
FIG. 2 is a schematic view of a paper ejection device according to a second exemplary embodiment of the present disclosure.

FIG. 2 is a schematic view of a paper ejection device according to a second exemplary embodiment of the present disclosure.

Paper that has passed through the fixing unit 18 in the direction of the arrow C1 is moved in the direction of the arrow C2 while being curved along the chute 19, and ejected by the ejection unit 20. The ejected paper is moved while being curved in the direction of the arrow C3 in contact with a paper ejection tray 40, and further moved in the direction of the arrow C4 to be housed in the paper ejection tray 40.

The paper ejection tray 40 is supported on a housing 10A of the printer so as to be rotatable about a rotary shaft 401 at the lower end portion. The housing 10A of the printer includes a support arm 41. The support arm 41 is also supported on the housing 10A of the printer so as to be rotatable about a rotary shaft 411 at the lower end portion. Two protrusions 402 and 403 are provided on a side surface of the paper ejection tray 40. On the other hand, a hole 412 is provided at the upper end portion of the support arm 41. When the paper ejection tray 40 is in the posture indicated by the solid line in FIG. 2, the protrusion 402 which is located close to the middle of the side surface of the paper ejection tray 40 is fitted in the hole 412 of the support arm

41. Consequently, the paper ejection tray 40 is stably supported in the posture (A) indicated by the solid line.

The paper ejection tray 40 is changeable in angle to the posture (B) and the posture (C). When the paper ejection tray 40 is in the posture (B), the protrusion 403 which is positioned close to the upper end of the side surface of the paper ejection tray 40 is fitted in the hole 412 of the support arm 41. Consequently, the paper ejection tray 40 is stably supported in the posture (B). When the paper ejection tray 40 is changed to the posture (C), the paper ejection tray 40 is laid on the housing 10A of the printer with the support arm 41 disengaged from the paper ejection tray 40. This allows the paper ejection tray 40 to be changed to the posture (C).

In this manner, in the case of the second exemplary embodiment illustrated in FIG. 2, the paper ejection tray 40 is adjustable in angle to the three postures (A), (B), and (C). The posture (A) is used to strongly correct curl of the paper by curving the paper more sharply than the curve caused by the chute 19. The paper ejection tray 40 in the posture (B) is at such an angle that the paper is curved more weakly than curved by the chute 19. The posture (B) is used when it is not necessary to strongly correct curl of the paper but it is necessary to correct such curl to a degree. The posture (C) is used when it is not necessary to consider correcting curl of the paper.

In the case of the second exemplary embodiment, the angle of the paper ejection tray 40 is adjustable to an angle at which it is not necessary to consider correcting curl of the paper. However, curl of the paper may be corrected at all times with the angle of the paper ejection tray 40 kept in a range in which curl of the paper is corrected, either strongly or weakly.

Figure 3:
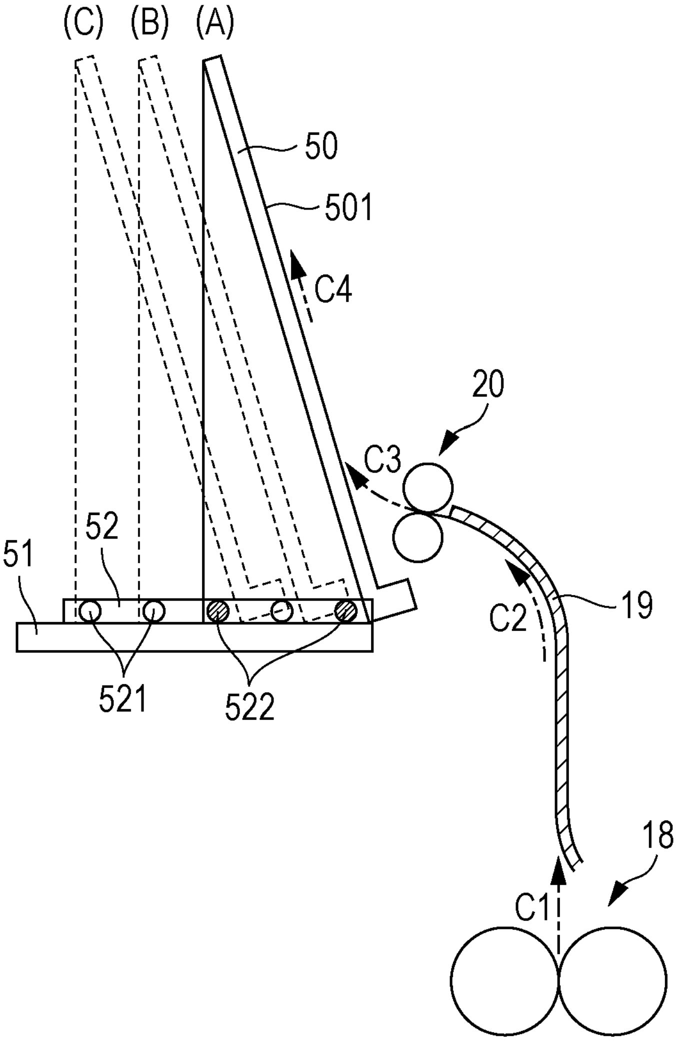
FIG. 3 is a schematic view of a paper ejection device according to a third exemplary embodiment of the present disclosure.

FIG. 3 is a schematic view of a paper ejection device according to a third exemplary embodiment of the present disclosure.

Paper that has passed through the fixing unit 18 in the direction of the arrow C1 is moved in the direction of the arrow C2 while being curved along the chute 19, and ejected by the ejection unit 20. The ejected paper is moved while being curved in the direction of the arrow C3 in contact with a paper ejection tray 50, and further moved in the direction of the arrow C4 to be housed in the paper ejection tray 50.

The paper ejection tray 50 is placed on a support base 51 fixed to the housing 10A of the printer. The paper ejection tray 50 is interposed between guide plates 52 on both sides. The guide plates 52 each have five holes 521 formed at equal intervals. The paper ejection tray 50 is provided with two holes (not illustrated) positioned at the same height as the holes 521 of the guide plates 52 when placed on the support base 51. The two holes are spaced from each other by a distance corresponding to two intervals of the holes 521. The paper ejection tray 50 is placed on the support base 51, the holes 521 of the guide plates 52 and the holes of the paper ejection tray 50 are aligned with each other, and pins 522 are inserted into the holes. Consequently, the paper ejection tray 50 is stably supported on the support base 51.

The paper ejection tray 50 is movable to three locations, namely the position (A), the position (B), and the position (C). However, the angle of a surface 501 of the paper ejection tray 50 to receive paper is not varied when the paper ejection tray 50 is moved to any position. The paper ejection tray 50 varies how much curl is corrected, by varying the distance from the ejection unit 20.

In this manner, in the case of the third exemplary embodiment illustrated in FIG. 3, the paper ejection tray 50 is adjustable to the three positions (A), (B), and (C). The position (A) is used to strongly correct curl of the paper by curving the paper more sharply than the curve caused by the chute 19. The position (B), at which the paper is curved more weakly than curved by the chute 19, is used when it is not necessary to strongly correct curl of the paper but it is necessary to correct such curl to a degree. The position (C) is used when it is not necessary to consider correcting curl of the paper.

Also in the third exemplary embodiment, as in the case of the second exemplary embodiment discussed above, the position of the paper ejection tray 50 is adjustable to a position at which it is not necessary to consider correcting curl of the paper. However, curl of the paper may be corrected at all times with the position of the paper ejection tray 50 kept in a range in which curl of the paper is corrected, either strongly or weakly.

Figure 4:
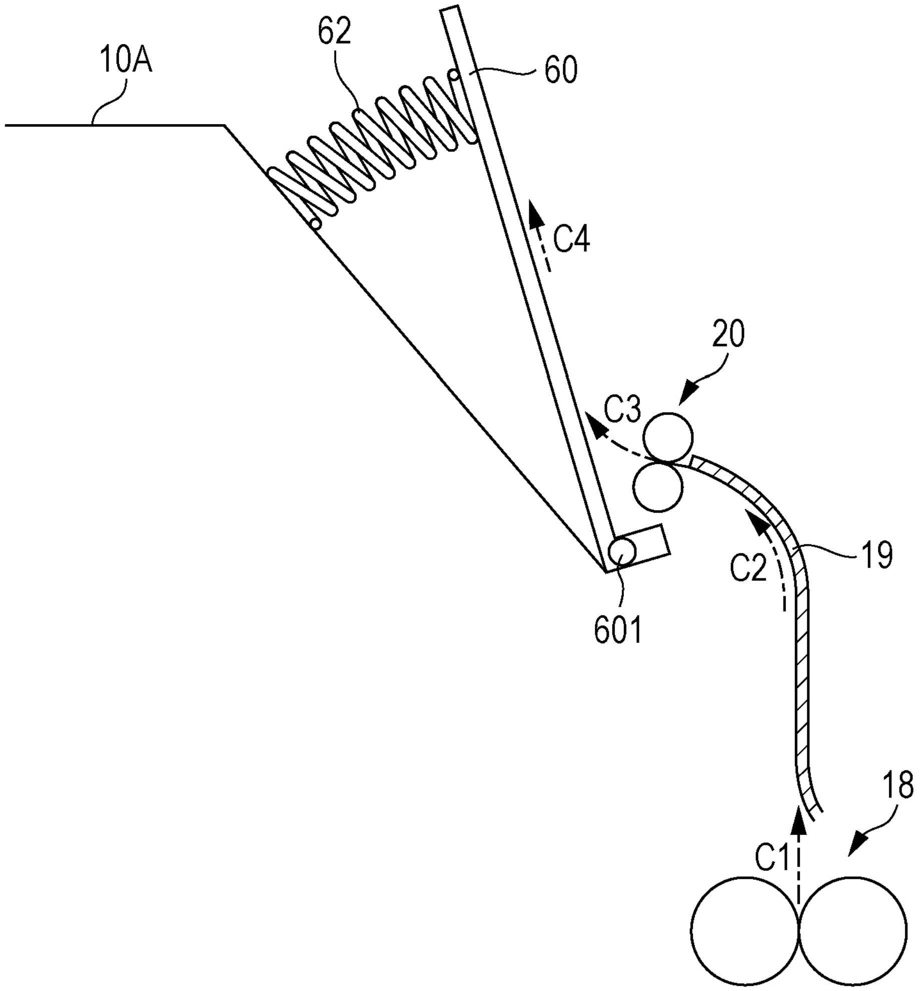
FIG. 4 is a schematic view of a paper ejection device according to a fourth exemplary embodiment of the present disclosure.

FIG. 4 is a schematic view of a paper ejection device according to a fourth exemplary embodiment of the present disclosure.

Paper that has passed through the fixing unit 18 in the direction of the arrow C1 is moved in the direction of the arrow C2 while being curved along the chute 19, and ejected by the ejection unit 20. The ejected paper is moved while being curved in the direction of the arrow C3 in contact with a paper ejection tray 60, and further moved in the direction of the arrow C4 to be housed in the paper ejection tray 60.

The paper ejection tray 60 is supported on the housing 10A of the printer so as to be rotatable about a rotary shaft 601 at the lower end portion. The upper portion of the paper ejection tray 60 is supported on the housing 10A of the printer via a coil spring 62. The paper ejection tray 60 is set to an angle at which the paper is curved more sharply than curved by the chute 19.

A case where a plurality of sheets of paper are sequentially housed in the paper ejection tray 60 will be considered. If the position or the angle of the paper ejection tray 60 is fixed in that case, the distance between latter sheets of paper and the ejection unit 20 becomes shorter. This may correct curl so strongly that the latter sheets of paper are curled in the opposite direction.

In the fourth exemplary embodiment illustrated in FIG. 4, the strength of curl correction is kept substantially constant for even the first sheet of paper and sheets of paper that come after a large number of sheets of paper are housed in the paper ejection tray 60. That is, when sheets of paper are accumulated in the paper ejection tray 60, the coil spring 62 is contracted by the weight of the sheets of paper, which makes the angle of the paper ejection tray 60 gentler. Consequently, the curl correcting force is reduced compared to a case where the angle of the paper ejection tray 60 is constant. The strength of the coil spring 62 is adjusted such that an increase in the curl correcting force due to the shortening distance between sheets of paper accumulated in the paper ejection tray 60 and the ejection unit 20 and a reduction in the curl correcting force due to the angle of the paper ejection tray 60 becoming gentler are balanced with each other. Alternatively, the angle of the paper ejection tray 60 may become gentler as the coil spring 62 is contracted when paper ejected from the ejection unit 20 abuts against a surface of the paper ejection tray 60 to receive the paper P.

In the fourth exemplary embodiment illustrated in FIG. 4, curl of the paper is corrected by curving the paper more sharply than the curve caused by the chute 19 in the entire range in which the angle of the paper ejection tray 60 is adjusted.

Figure 5:
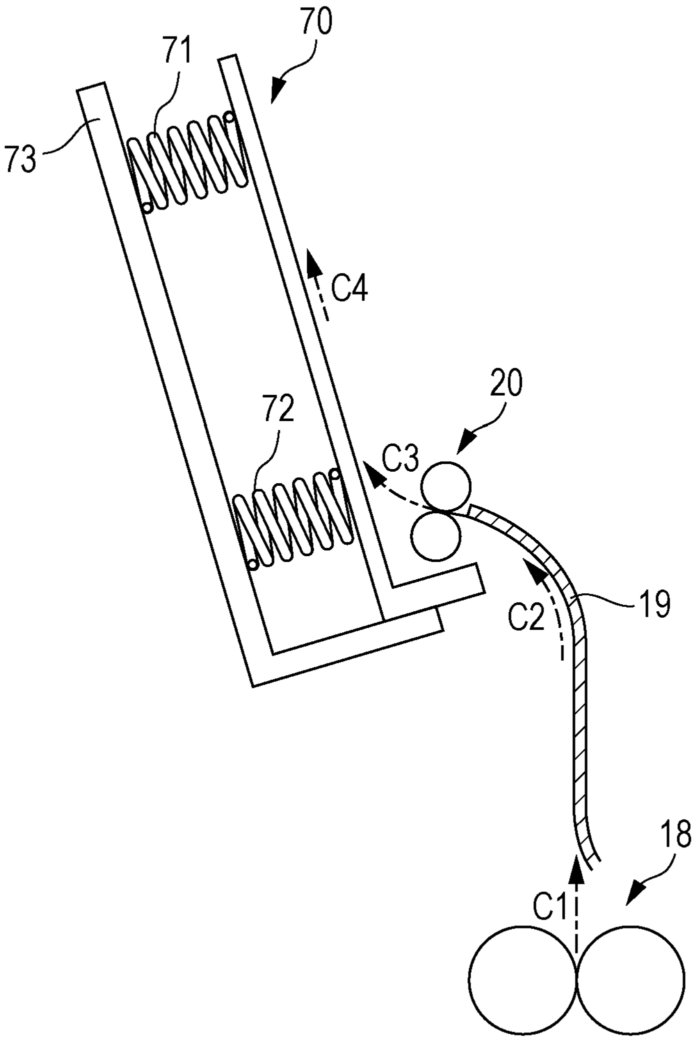
FIG. 5 is a schematic view of a paper ejection device according to a fifth exemplary embodiment of the present disclosure.

FIG. 5 is a schematic view of a paper ejection device according to a fifth exemplary embodiment of the present disclosure.

Paper that has passed through the fixing unit 18 in the direction of the arrow C1 is moved in the direction of the arrow C2 while being curved along the chute 19, and ejected by the ejection unit 20. The ejected paper is moved while being curved in the direction of the arrow C3 in contact with a paper ejection tray 70, and further moved in the direction of the arrow C4 to be housed in the paper ejection tray 70.

The paper ejection tray 70 is supported via coil springs 71 and 72 on a support member 73 fixed to the housing 10A of the printer, and placed on the support member 73 so as to be slidable in the direction in which the coil springs 71 and 72 are expanded and contracted.

In the fifth exemplary embodiment illustrated in FIG. 5, as in the fourth exemplary embodiment illustrated in FIG. 4, the strength of curl correction is kept substantially constant for even the first sheet of paper and sheets of paper that come after a large number of sheets of paper are housed in the paper ejection tray 70. That is, when sheets of paper are accumulated in the paper ejection tray 70, the coil springs 71 and 72 are contracted by the weight of the sheets of paper, which increases the distance between the paper ejection tray 70 and the ejection unit 20. Consequently, the curl correcting force is reduced compared to a case where the position of the paper ejection tray 70 is fixed. The strength of the coil springs 71 and 72 is adjusted such that an increase in the curl correcting force due to the shortening distance between the uppermost sheet of paper accumulated in the paper ejection tray 70 and the ejection unit 20 and a reduction in the curl correcting force due to movement of the paper ejection tray 70 away from the ejection unit 20 are balanced with each other. Alternatively, the distance between the paper ejection tray 70 and the ejection unit 20 may become longer as the coil springs 71 and 72 are contracted when paper ejected from the ejection unit 20 abuts against a surface of the paper ejection tray 30 to receive the paper P.

Also in the fifth exemplary embodiment illustrated in FIG. 5, as in the fourth exemplary embodiment illustrated in FIG. 4, curl of the paper is corrected by curving the paper more sharply than the curve caused by the chute 19 in the entire range in which the position of the paper ejection tray 60 is adjusted.

Figure 6:
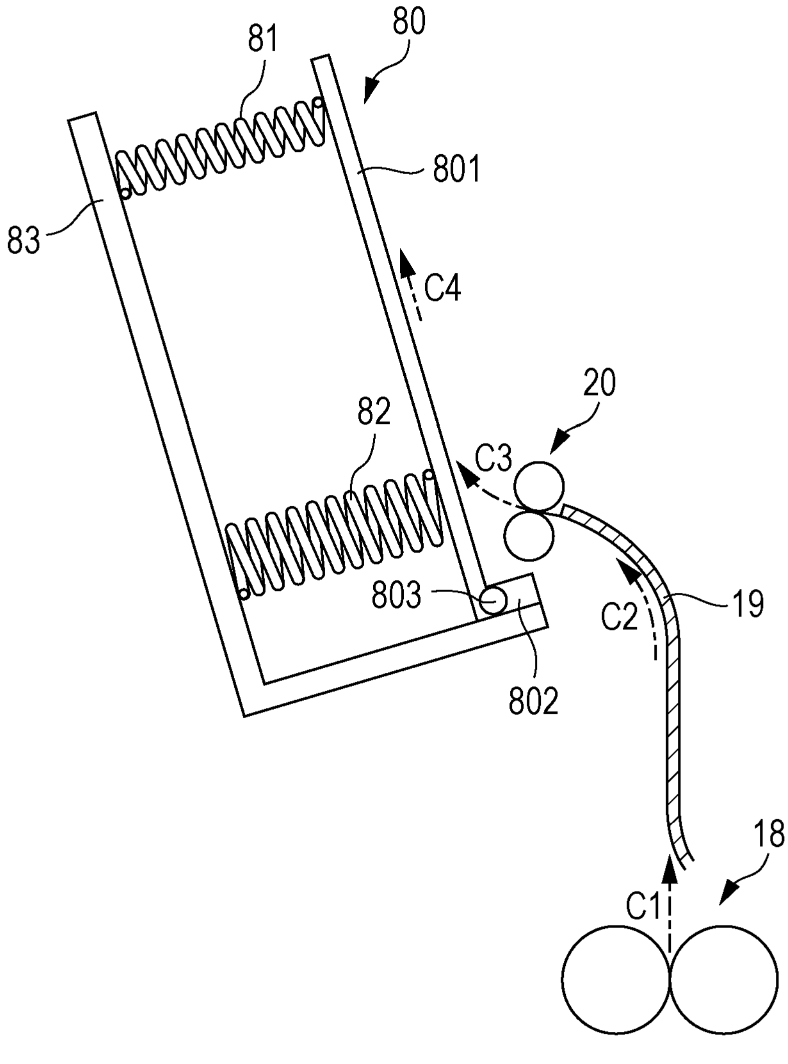
FIG. 6 is a schematic view of a paper ejection device according to a sixth exemplary embodiment of the present disclosure.

FIG. 6 is a schematic view of a paper ejection device according to a sixth exemplary embodiment of the present disclosure.

Paper that has passed through the fixing unit 18 in the direction of the arrow C1 is moved in the direction of the arrow C2 while being curved along the chute 19, and ejected by the ejection unit 20. The ejected paper is moved while being curved in the direction of the arrow C3 in contact with a paper ejection tray 80, and further moved in the direction of the arrow C4 to be housed in the paper ejection tray 80.

The paper ejection tray 80 includes an ejected paper receiving portion 801 and a base portion 802. The ejected paper receiving portion 801 is supported on the base portion 802 so as to be rotatable about a rotary shaft 803. In the paper ejection tray 80, the ejected paper receiving portion 801 is supported via coil springs 81 and 82 on a support member 83 fixed to the housing 10A of the printer, and the base portion 802 is placed on the support member 83 so as to be slidable in the direction in which the coil springs 81 and 82 are expanded and contracted.

In the sixth exemplary embodiment illustrated in FIG. 6, as in the fourth and fifth exemplary embodiments illustrated in FIGS. 4 and 5, the strength of curl correction is kept substantially constant for even the first sheet of paper and sheets of paper that come after a large number of sheets of paper are housed in the paper ejection tray 80. That is, when sheets of paper are accumulated in the paper ejection tray 80, the coil springs 81 and 82 are contracted by the weight of the sheets of paper. The upper coil spring 81 is a spring with a weaker spring force than that of the lower coil spring 82. Therefore, when the coil springs 81 and 82 are contracted by the weight of the sheets of paper, the upper coil spring 81 is contracted more significantly than the lower coil spring 82. Thus, when sheets of paper are accumulated in the paper ejection tray 80, the distance between the paper ejection tray 80 and the ejection unit 20 is increased by the weight of the sheets of paper, and the ejected paper receiving portion 801 of the paper ejection tray 80 is tilted to vary the angle of the ejected paper receiving portion 801. Consequently, the curl correcting force is reduced compared to a case where the position of the paper ejection tray 80 or the angle of the ejected paper receiving portion 801 is fixed. The strength of the coil springs 81 and 82 is adjusted such that an increase in the curl correcting force due to the shortening distance between the uppermost sheet of paper accumulated in the paper ejection tray 80 and the ejection unit 20 and a reduction in the curl correcting force due to movement of the paper ejection tray 80 away from the ejection unit 20 and a change in the angle of the ejected paper receiving portion 801 are balanced with each other.

Also in the sixth exemplary embodiment illustrated in FIG. 6, as in the fourth and fifth exemplary embodiments illustrated in FIGS. 4 and 5, curl of the paper is corrected by curving the paper more sharply than the curve caused by the chute 19 in the entire range in which the position or the angle of the paper ejection tray 80 is adjusted.

In the exemplary embodiments illustrated in FIGS. 4 to 6, the angle or the position of the paper ejection tray is adjusted using the spring. It is also conceivable to adjust the angle or the position of the paper ejection tray using a drive force from a drive source such as a motor.

Next, the sharpness of the curves will be discussed.

Figure 7:
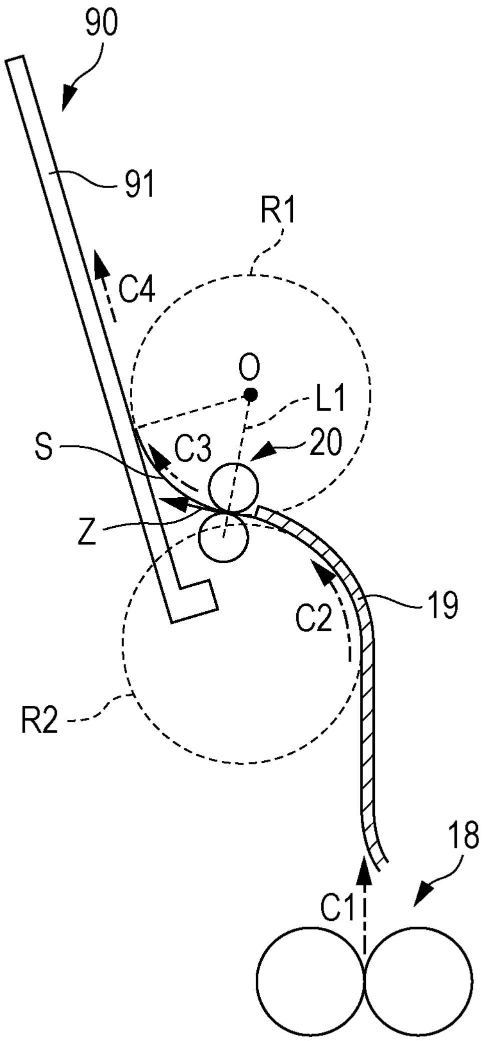
FIG. 7 illustrates the sharpness of curve.

FIG. 7 illustrates the sharpness of curve. A paper ejection tray 90 represents the paper ejection trays described so far.

Curve is described as being shaper as the curvature of the curve is larger, that is, as the radius of curvature of the curve is smaller. The sharpness of the curve caused by the chute 19 is prescribed as the curvature, in the paper guiding direction, of a surface of the chute 19 that guides the paper. If the curvature of the chute 19 in the paper guiding direction differs among locations in the paper guiding direction, the sharpness of the curve caused by the chute 19 is defined as the maximum curvature (minimum radius of curvature).

Curve on the side of the paper ejection tray 90 is defined as the curvature of an arc S formed when paper ejected from the ejection unit 20 contacts the paper ejection tray 90. The arc S may be defined as follows.

The arrow Z indicates the position and the direction of paper ejection from the ejection unit 20. A circle R1 that passes through the position of paper ejection from the ejection unit 20, that has a center O on a line L1 that extends at the right angle with respect to the paper ejection direction, and that contacts the arrow Z and a paper receiving surface 91 of the paper ejection tray 90 is considered. The arc S of the circle R1 which extends from the ejection unit 20 to the paper ejection tray 90 determines the sharpness of curve of paper on the side of the paper ejection tray 90.

A circle R2 with the same dimensions as those of the circle R1 is considered. If the circle R2 may contact a surface of the chute 19 on the side of contact with the paper over the entire range of contact with the paper, the curve caused by the paper ejection tray 90 is sharper than the curve caused by the chute 19.

Figure 8:
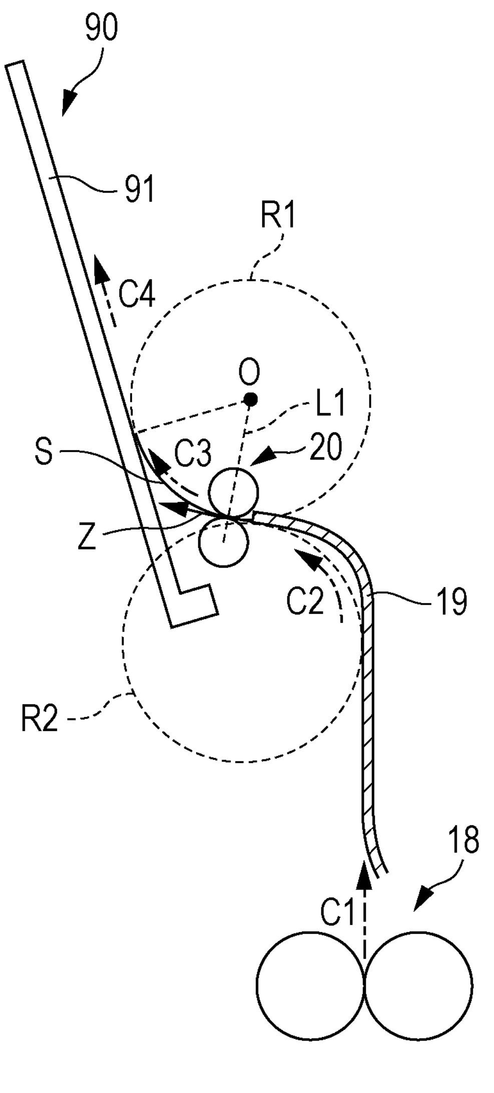
FIG. 8 illustrates the sharpness of curve as with FIG. 7.

FIG. 8 illustrates the sharpness of curve as with FIG. 7. FIG. 8 is different from FIG. 7 in only the shape of the chute 19.

In the case of FIG. 8, when the circle R2 with the same radius as that of the circle R1 is considered, the surface of the chute 19 on the side of contact with the paper has a region not contacted by the circle R2. In this case, the curve caused by the chute 19 is sharper than the curve caused by the paper ejection tray 90.

As has been described above, the exemplary embodiments of the present disclosure provide a paper ejection device and an image forming apparatus that correct curl flexibly compared to a case where the position or the angle of a housing portion is fixed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A paper ejection device comprising:

an ejection portion that ejects sheets of paper;

a housing portion that houses the ejected sheets of paper in a sequentially stacked state; and a guiding portion that guides the sheets of paper, before being ejected, to the ejection portion while curving the sheets of paper, wherein the housing portion is adjustable to a plurality of angles including at least an angle at which the ejected sheets of paper are housed while being curved in a direction opposite to a direction in which the sheets of paper have been curved by the guiding portion, wherein the angle of the housing portion at which the housing portion houses the sheets of paper while curving the sheets of paper is changed in accordance with a number of the sheets of paper housed in the housing portion such that the angle is changed to such a direction that the sheets of paper are curved by the housing portion more gently as a larger number of the sheets of paper are housed in the housing portion.

2. The paper ejection device according to claim 1, wherein the housing portion houses the ejected sheets of paper while being curved in the direction opposite to the direction in which the sheets of paper have been curved by the guiding portion at all angles within an angular range in which the housing portion is adjustable.

3. The paper ejection device according to claim 1, further comprising a heating portion that heats the sheets of paper before being ejected, wherein the housing portion is adjustable to a plurality of angles including at least an angle at which the sheets of paper are housed while being curved in the direction opposite to the direction in which the sheets of paper have been curved by the guiding portion and more sharply than curved by the guiding portion.

4. The paper ejection device according to claim 3, wherein the housing portion houses the sheets of paper while being curved in the direction opposite to the direction in which the sheets of paper have been curved by the guiding portion and more sharply than curved by the guiding portion at all angles within an angular range in which the housing portion is adjustable.

5. The paper ejection device according to claim 1, wherein the housing portion is supported by a spring member adjusted such that the angle of the housing portion is changed in accordance with a weight of the sheets of paper housed in the housing portion.

6. The paper ejection device according to claim 1, wherein the housing portion is supported by a spring member adjusted such that the angle of the housing portion is changed when the sheets of paper ejected from the ejection portion abut against the housing portion.

7. The paper ejection device according to claim 1, wherein the housing portion includes a first housing portion, which is fixed, and a second housing portion that houses the sheets of paper in place of the first housing portion when the second housing portion is mounted.

8. An image forming apparatus comprising:

an image forming section that forms an image on paper; and the paper ejection device according to claim 1, which ejects the paper on which the image has been formed.

9. A paper ejection device comprising:

an ejection portion that ejects sheets of paper;

a housing portion that houses the ejected sheets of paper in a sequentially stacked state;

a guiding portion that guides the sheets of paper, before being ejected, to the ejection portion while curving the sheets of paper; and a heating portion that heats the sheets of paper before being ejected, wherein the housing portion is movable to a plurality of positions, with respect to the ejection portion, including at least a position at which the sheets of paper are housed while being curved in a direction opposite to a direction in which the sheets of paper have been curved by the guiding portion and more sharply than curved by the guiding portion, wherein a position of the housing portion is changed in accordance with a number of the sheets of paper housed in the housing portion such that the housing portion is moved in a direction farther away from the ejection portion as a larger number of the sheets of paper are housed in the housing portion.

10. The paper ejection device according to claim 9, wherein the housing portion houses the sheets of paper while curving the sheets of paper in the direction opposite to the direction in which the sheets of paper have been curved by the guiding portion and more sharply than curved by the guiding portion at all positions within a distance range in which the housing portion is movable.

11. The paper ejection device according to claim 9, wherein the housing portion is supported by a spring member adjusted such that the position of the housing portion is changed in accordance with a weight of the sheets of paper housed in the housing portion.

12. The paper ejection device according to claim 9,
wherein the housing portion is supported by a spring member adjusted such that the position of the housing portion is changed when the sheets of paper ejected from the ejection portion abut against the housing portion.

* * * * *